(No Model.)
C. C. SHULTS.
CUTTER BAR.
No. 457,379. Patented Aug. 11, 1891.
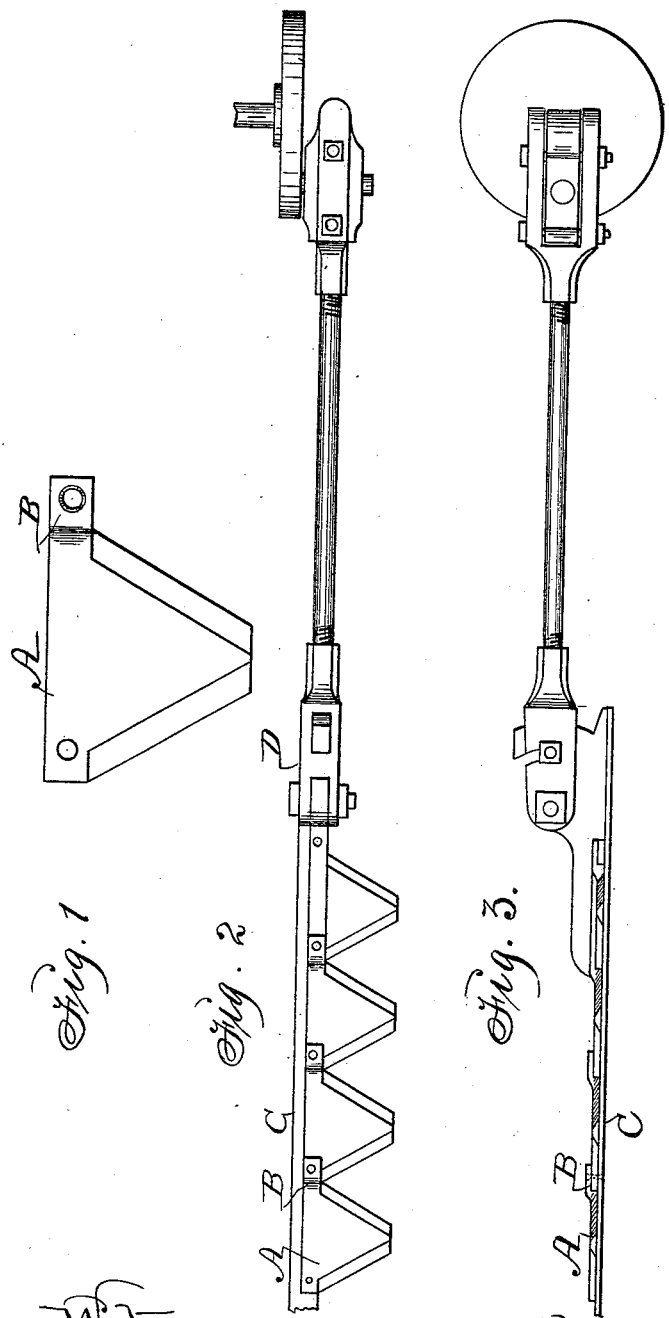

UNITED STATES PATENT OFFICE.

CHANCY C. SHULTS, OF WINTERSET, IOWA.

CUTTER-BAR.

SPECIFICATION forming part of Letters Patent No. 457,379, dated August 11, 1891.

Application filed November 17, 1890. Serial No. 371,760. (No model.)

*To all whom it may concern:*

Be it known that I, CHANCY C. SHULTS, a citizen of the United States of America, and a resident of Winterset, in the county of Madison and State of Iowa, have invented an Improved Cutting Mechanism for Reapers and Mowers, of which the following is a specification.

My object is to simplify the construction, reduce the cost, and facilitate the repairing of a harvester-sickle; and my invention consists in the construction and combination of knife-sections or cutters with a plane straight bar, as hereinafter set forth, pointed out in the claim, and illustrated in the accompanying drawings, in which—

Figure 1 is a top view of one of the cutters. Fig. 2 shows a series of cutters combined, and Fig. 3 is a longitudinal section of Fig. 2.

A is a cutter that has an integral extension B at one of its rear corners. It rises above the top surface of the cutter, so that its under face will be in the horizontal plane of the top surface of the cutter and adapted to overlap the corner of an adjoining cutter. It has a perforation that will coincide with a perforation in the corner of another cutter, so that when the extension B overlaps the rear corner of a corresponding cutter the two can be jointly fastened together and to a cutter-bar by means of a rivet or bolt.

D represents a plane straight bar that has perforations at intervals of space corresponding with the space between the perforations in the cutter A and its extension B. By simply placing cutters on the bar in succession, so that the extension B of one will overlap the corner of another, and then fixing them jointly to the bar by means of bolts or rivets, as shown in Figs. 2 and 3, I can readily produce a simple, strong, and durable cutter or sickle for reapers and mowers; and when a cutter is damaged I can readily remove it and substitute a new one by simply taking out two rivets or bolts and replacing them together with a new cutter or knife-section A.

I claim as my invention—

An improved cutter or sickle for reapers and mowers, comprising a straight bar and a series of knife-sections or cutters, each of which has a horizontal perforated extension and the bottom face of each extension in the plane of the top surface of the body of the cutter and adapted to overlap the perforated corner of another cutter and fixed to the bar in the manner set forth, for the purposes stated.

CHANCY C. SHULTS.

Witnesses:
 G. W. SEEVERS,
 C. DANFORTH.